United States Patent Office 2,963,528
Patented Dec. 6, 1960

2,963,528
ISOMERIZATION OF NORMAL PARAFFINS

Donald Schwartz, Moorhead, Minn., assignor to Esso Research and Engineering Company, a corporation of Delaware No Drawing. Filed Oct. 21, 1958, Ser. No. 768,566

6 Claims. (Cl. 260—683.75)

The present invention relates to an improved method for isomerizing normal straight chain hydrocarbons to valuable isomeric high octane branched chain hydrocarbons. More specifically, the present invention relates to a catalytic system for carrying out this economically important process whereby side reactions and in particular product and reagent cracking are minimized.

The isomerization of normal paraffins and slightly branched paraffins having 4 to 10 carbon atoms per molecule to more highly branched chain molecules is a well known commercial process. The catalysts normally employed are the Friedel-Crafts type, such as $AlCl_3$, $AlBr_3$, $FeCl_3$ and the like, promoted and activated generally by a hydrogen halide. Normally, temperatures in the range of 200° to 420° F. are employed when $AlCl_3$ is employed, and lower temperatures in the range of 32° to 100° F. when the more hydrocarbon-soluble $AlBr_3$ is employed. These catalysts are generally supported on carriers such as Porocel, alumina, active char and the like.

An important problem involved in isomerizing hydrocarbons, particularly those in the higher molecular weight range, is the fact that even at relatively low temperatures and mild reaction conditions, a substantial amount of cracking occurs. This not only cuts down the yield of desired isomerization product but also involves formation of olefins which readily react with the catalysts to form complexes and polymers. As a result, the catalyst readily becomes deactivated and requires expensive regeneration, thus markedly affecting the economics of the operation.

This problem has been recognized hitherto and many attempts have been made to find an answer. Certain cyclic compounds such as naphthenes and some aromatics, notably benzene, have been found to have a cracking inhibiting effect. However, particularly in the case of the n-paraffins having 6 or more carbon atoms, the cracking inhibiting effect of these cyclic compounds is not adequate or so much naphthene is required that reactor capacity and throughput are diminished.

A further problem related to the cracking of hydrocarbons during isomerization is the nature of the complexes and polymers that are formed as a result of the reaction. These materials are generally referred to as "sludges." It appears that these sludges are of two kinds. One sludge is highly active, causing further cracking, deactivates the catalyst, coats the catalyst support, and is not readily removed by draining the reactor. This sludge is highly viscous and is yellow to orange in color. The second type of sludge does not cause cracking, is inactive, does not deactivate the catalyst appreciably, and being non-viscous, is readily drained from the catalyst bed. This sludge is very dark orange to black in color. The "active" sludge cannot be tolerated in an isomerization process, whereas the "inactive" sludge may be tolerated without significant process difficulties or disadvantages.

It has now been found that the cracking of paraffins under isomerization conditions in the presence of aluminum halide catalysts may be markedly decreased and in some cases substantially eliminated by effecting the reaction in the presence of certain iodine-comprising compositions and in the further presence of hydrogen. It has further been found that the nature of the sludge formed in the presence of iodine and hydrogen is of the "inactive" variety, thus allowing extended periods of onstream operation even in the presence of sludge.

In accordance with the present invention, the iodine-comprising composition, and preferably elementary iodine, is added to the extent of 0.1 to 1.0% by weight of the aluminum halide catalyst. It is frequently desirable to carry out the isomerization in a vessel containing a fixed bed of supported catalyst and activator. As catalyst supports there may be employed $Al_2O_3$, Porocel, silica gel, activated carbon and other materials conventionally used in this process.

The reaction may be carried out in batch or continuous operation, preferably with agitation and preferably in the liquid phase. The normal paraffin, with or without the addition of 5 to 50% of added naphthenes such as methyl cyclopentane or cyclohexane is passed through a bed of, for instance, Porocel, which supports the iodine inhibitor and which adsorbs in the surface some 8% of $AlBr_3$, which is the preferred isomerization catalyst; reaction conditions are temperatures in the range of 32° to 125° F., preferably 70° to 80° F. and pressures from atmospheric to 200 p.s.i.g., preferably 0 to 10 p.s.i.g. Particularly good results are obtained when, in addition, there is maintained a hydrogen pressure of 25 to 125 p.s.i.g. in the system. Hydrogen alone, however, without the iodine, will not effectively reduce the cracking, and the sludge formed is of the "active" variety. Also, hydrogen alone will lessen the activity of the catalyst system.

The iodine inhibitor may be incorporated in the reactor bed by any desired means, such as by heating the support in the presence of the iodine, prior to treating with the aluminum bromide isomerization catalyst.

The amount of activator varies with the catalyst, its age, temperature and other conditions, but ordinarily the amount is from 0.1 to 1.0% by weight of the catalyst which, in turn, is from 5 to 40% of the feed stock treated. The latter may be a virgin naphtha or other feed stock rich in n-paraffins and boiling in the range of 100° to 375° F.

The time of reaction varies with other factors, such as temperature, amounts of catalyst, nature thereof, and particular feed stock treated. In general, it may be from 0.5 to 6 hours.

A comparison of results obtained in the following examples clearly shows the advantages obtained by proceeding in accordance with the present invention. In each of the experimental runs below, a hydrocarbon mixture containing 67% n-heptane and 33% methyl cyclohexane was reacted for 2 hours at 78° F. in the presence of 20% AlBr₃ and 40% "Porocel," i.e. calcined bauxite.

|  | A | | B | | C | |
|---|---|---|---|---|---|---|
|  | No H₂ | | 100 p.s.i.g. H₂ | | 125 p.s.i.g. H₂ | |
|  | No I₂ | 0.1% I₂ | No I₂ | 0.1% I₂ | No I₂ | 0.1% I₂ |
| Percent Conversion | 77.5 | 82.8 | 71 | 76 | 39.8 | 73.5 |
| Percent Isomerization | 76.0 | 77.5 | 65 | 72 | 38.0 | 72.5 |
| Percent Cracking | 1.5 | 5.4 | 6 | 4 | 1.8 | 1.4 |
| Sludge Color | Yellow | Yellow | Dark Orange | Dark Orange | Black | Black |

The above data (A) show that there is little isomerization advantage in using iodine in the absence of hydrogen. When not using hydrogen, the use of iodine increases conversion from 77.5 to 82.8% but also increases the amount of cracking from 1.5 to 5.4%. However, whether iodine is used or not, in the absence of hydrogen, an "active" sludge is formed which shortens the life of the catalyst. In the Run B it is seen that iodine begins to show a definite advantage when used in the presence of 100 p.s.i.g. of hydrogen. Here the increase in conversion from 71 to 76% is accompanied by more than 10% increase in isomerization (65 to 72%) and more than 33% decrease in cracking (6 to 4%). Thus it is seen that as contrasted with run A, iodine increases isomerization and decreases cracking in the presence of hydrogen. The sludge remaining is also of the "inactive" kind. In run C it will be noted that though in the presence of hydrogen and absence of iodine both conversion and isomerization are very low, the presence of iodine markedly increases both conversion and isomerization while decreasing substantially the cracking. Since cracking is kept at such low proportions, very little sludge is formed and the sludge that is formed is "inactive" indicating long catalyst life and ease of removal.

To demonstrate the difference between "active" and "inactive" sludges as formed in runs A and C, the following data are submitted:

Upon pouring off the products from runs A and C above but leaving the supports intact and recharging the bombs with fresh feed, consisting of 67% n-heptane and 33% methyl cyclohexane, and 5% aluminum bromide, and shaking for 30 minutes at 78% F. and atmospheric pressure, the results in the table below were obtained:

|  | Run A | Run C |
|---|---|---|
| Percent Conversion | 17 | 33 |
| Percent Cracking | Trace | None |

The sludge on the catalyst after the initial 2 hour run in A was active as illustrated by the yellow color, inability to flow readily and by the relatively low conversion (17%) resulting on a further ½ hour run with it. The sludge on the catalyst after the initial 2 hour run in C was inactive as illustrated by the dark black color, low viscosity, and relative high activity as evidenced by the 33% conversion on a further ½ hour run with it.

To sum up runs A, B and C, hydrogen lessens the activity of the catalyst system but maintains the life of the catalyst by preventing cracking; if a sludge is produced with the use of hydrogen it is an inactive one. Iodine when used with hydrogen restores the activity of the cracking and sludge inhibited system to that of the uninhibited but cracking and sludge producing system.

To determine whether this cracking inhibition phenomenon of iodine was common to the halogens, experiment designated "D" was carried out. The extremely low isomerization and high cracking activity of this combination makes it highly undesirable for use in isomerization.

D

[20 wt. percent AlBr₃+40 wt. percent Porocel containing 0.1% bromine on C₇ (67% n-C₇+33% MCH) for 2 hrs. at 78° F.]

Percent conversion _____ 67.0
Percent isomerization _____ 19.3
Percent cracking _____ 47.7

What is claimed is:

1. An improved process for isomerizing paraffinic hydrocarbons into more highly branched chain hydrocarbons which comprises contacting said hydrocarbons with an aluminum bromide comprising catalyst at a temperature in the range of from 32° to about 125° F. and pressures in the range of 0 to 200 p.s.i.g. in a reaction zone, further maintaining in said reaction zone 0.1 to 1.0% by weight, based on AlBr₃, of a cracking inhibitor comprising elementary iodine inhibitor and hydrogen gas, and recovering improved yields of isomerization product.

2. An improved process for isomerizing paraffinic hydrocarbons having from 5 to 7 carbon atoms to more highly branched isomers which comprises contacting said hydrocarbons with a supported aluminum bromide catalyst in a liquid phase reaction zone at a temperature of about 32° to 125° F., further maintaining in said reaction zone 0.1 to 1.0% by weight, based on AlBr₃, of elementary iodine, maintaining a hydrogen partial pressure of from 25 to 125 p.s.i.g. in said zone, and recovering high yields of isomerization product.

3. The process of claim 2 wherein said catalyst is maintained as a fixed bed.

4. The process of claim 2 wherein said catalyst comprises an alumina support.

5. The process of claim 2 wherein said catalyst comprises a calcined bauxite support.

6. The process of claim 2 wherein 5 to 50% by volume of naphthenes, based on hydrocarbon feed, is maintained in said zone.

References Cited in the file of this patent
UNITED STATES PATENTS

| 2,265,870 | Schuit | Dec. 9, 1941 |
| 2,280,748 | Calhoun | Apr. 21, 1942 |
| 2,443,607 | Evering | June 22, 1948 |